United States Patent [19]

Aboytes

[11] 4,315,844

[45] Feb. 16, 1982

[54] ORGANIC ELASTOMERS CONTAINING KAOLIN CLAY MODIFIED WITH ISOCYANATE COUPLING AGENTS AND MERCAPTOETHANOL

[75] Inventor: Peter Aboytes, Borger, Tex.

[73] Assignee: J. M. Huber Corporation, Locust, N.J.

[21] Appl. No.: 166,862

[22] Filed: Jul. 8, 1980

[51] Int. Cl.$^3$ .................... C08K 59/16; C08L 7/00
[52] U.S. Cl. .................... 260/42.16; 260/766
[58] Field of Search .................... 260/42.16, 766

[56] References Cited

U.S. PATENT DOCUMENTS

| | | | |
|---|---|---|---|
| 2,780,611 | 2/1957 | Grotenhius | 260/37 |
| 3,156,576 | 11/1964 | Grotenhius | 106/308 |
| 3,208,867 | 9/1965 | Weldes | 106/308 |
| 3,655,608 | 4/1972 | Guenther et al. | 260/37 N |
| 4,075,152 | 2/1978 | Taller | 260/37 N |

FOREIGN PATENT DOCUMENTS 410032  4/1974  U.S.S.R. .................... 260/42.16

*Primary Examiner*—Paul Lieberman
*Assistant Examiner*—Robert E. L. Sellers
*Attorney, Agent, or Firm*—Ernest A. Schaal; Harold H. Flanders

[57] ABSTRACT

An organic elastomer of low heat buildup is made by blending into the elastomer a kaolin clay which has been surface treated with a diisocyanate compound. One method of treating the kaolin clay is to vaporize the diisocyanate compound and contact the vaporized diisocyanate with the clay for from 10 minutes to one hour in the absence of water vapor.

1 Claim, No Drawings

4,315,844

ORGANIC ELASTOMERS CONTAINING KAOLIN CLAY MODIFIED WITH ISOCYANATE COUPLING AGENTS AND MERCAPTOETHANOL

BACKGROUND OF THE INVENTION

In general, the present invention relates to organic elastomers containing surface treated kaolin clays. More especially it relates to organic elastomers containing kaolin clays that have been surface treated with diisocyanate coupling agents.

Inorganic fillers such as silicas and clays have been used in rubber to reinforce and to improve certain properties of the rubber vulcanizates. The most common reinforcement material in tires is carbon black but carbon black is a high energy intensive product. As the price of energy increases the economics of carbon black makes it less desirable as a filler. Therefor, inorganic fillers which are modified with various coupling agents are slowly taking over part of the carbon black market.

SUMMARY OF THE INVENTION

Accordingly, it is an object of this invention to provide a new and highly effective process which overcomes the deficiencies of the prior art as described above.

Another object of this invention is to provide an organic elastomer having low heat buildup.

It is a further object of this invention to develop a low cost method of producing a mercapto-functional kaolin clay.

Other objects and a fuller understanding of this invention may be had by referring to the following description and claims.

The present invention overcomes the deficiences of the prior art and achieves its objectives by blending together an organic elastomer and a kaolin clay surface treated with a diisocyanate compound having the formula:

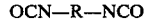
OCN—R—NCO

R is an alkylene, an arylene, or an alkenylene. Preferably R is either octadecylene, n propylene, n butylene, ethylene, methylene, phenylene, hexamethylene, dianisidine, diphenylmethane, or tolylene. The diisocyanate is preferably either 2,4-tolylene diisocyanate or 4,4'-diphenylmethane diisocyanate.

Examples of organic elastomers useful in the present invention are natural rubber, polyisoprene rubber, styrene-butadiene rubber, oil extended styrene-butadiene rubber/natural rubber, polychoroprene, ethylene-propylene-diene terpolymers, millable polyurethane rubber, chlorosulfonated polyethylene, polyacrylate, epichlorohydrin elastomer and polybutadiene.

The main constituent of kaolin clay is kaolinite which has the formula $Al_2O_3.2SiO_2.2H_2O$.

One method of preparing an organic elastomer containing surface treated modified dry kaolin clay is to vaporize the diisocyanate compound described above and contacting the vaporized diisocyanate compound with the dry kaolin clay for a period of time of from ten minutes to one hour in the absence of water vapor so that the diisocyanate constitutes a level of from 0.2 to 3% by weight of the dry kaolin clay, then blending the surface treated kaolin clay into an organic elastomer.

In one embodiment, the diisocyanate compound is 2,4-tolylene diisocyanate or 4,4'-diphenylmethane diisocyanate (also known as methylene-bis(4-phenylisocyanate)) and the treated kaolin clay is further treated with a compound reactive with isocyanate such as mercaptoethanol before it is blended into an organic elastomer. This is a low cost method of producing a mercaptofunctional kaolin clay.

Another method of preparing an organic elastomer containing a surface treated modified kaolin clay is to put the isocyanate in a solvent, treat the filler in the solvent for a period of time of from ten minutes to one hour so that the diisocyanate compound constitutes a level of from 0.2 to 3% by weight of the clay. The surface treatment occurs at reflux temperatures. Then this surface treated kaolin clay is blended into an organic elastomer.

DESCRIPTION OF THE PREFERRED EMBODIMENTS

In its broadest aspect, the present invention involves an organic elastomer containing a kaolin clay that has been surface treated with a diisocyanate compound.

In a preferred embodiment of the present invention, kaolin clay is surface treated with either 2,4-tolylene diisocyanate (TDI) or 4,4'-diphenylmethane diisocyanate (MDI). Then this surface treated kaolin clay is blended into an organic elastomer.

An example of a kaolin clay that works particularly well in the present invention is Suprex clay. Suprex is a registered trademark of the J. M. Huber Corporation for an airfloated sedimentary kaolin clay from South Carolina having the following typical properties: 2.60 g/ml density at 25 degrees Celsius; 1% maximum moisture; 0.17% maximum screen residue at 325 mesh; 74.76% G.E. Brightness; pH of 4.5–5.5 for 100 g clay/250 ml water; 0.3 micron mean particle size; 34–36 g/100 g clay oil absorption; and BET surface area of 20–24 sq m/g.

The diisocyanate compound has the formula:

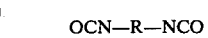
OCN—R—NCO

R is an alkylene, an arylene, or an alkenylene. Preferably R is either octadecylene, n propylene, n butylene, ethylene, methylene, phenylene, hexamethylene, dianisidine, diphenylmethane or tolylene. These R groups are preferred because they isolate the isocyanate groups so that both isocyanate groups will not react with the kaolin clay. Preferably the diisocyanate compound is either TDI or MDI, both of which are commercially available.

As with all coupling agents, certain safety precautions should be used in handling either 2,4-tolylene diisocyanate or 4,4'-diphenylmethane diisocyanate. These precautions are listed in the manufacturers literature. 2,4-tolylene diisocyanate is capable of producing severe dermatitis and bronchial spasm. Following inhalation (especially if severe), the victim should be observed by a physician. It is particularly irritating to the eyes. The toxicity of 4,4'-diphenylmethane diisocyanate is not known, but it is a known irritant. Both TDI and MDI are on the Toxic Substances List.

While the applicant does not wish to be bound by any particular theory as to how the invention works, it is thought that an isocyanate group on the compound reacts with an OH group on the clay to form a pendant group bridged to the surface by hydroxylisocyanate coupling. For example, when MDI is used:

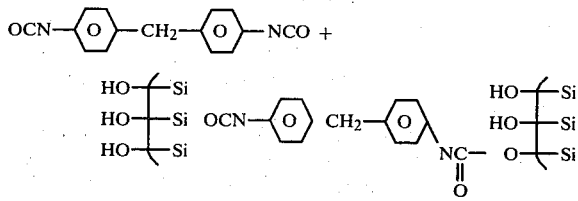

When the surface modified clay is reacted with mercaptoethanol, it is thought that the remaining isocyanate group reacts with the mercaptoethanol to produce a kaolin product with mercapto groups bridged to the surface through hydroxyl-isocyanate coupling. For example, when MDI is used:

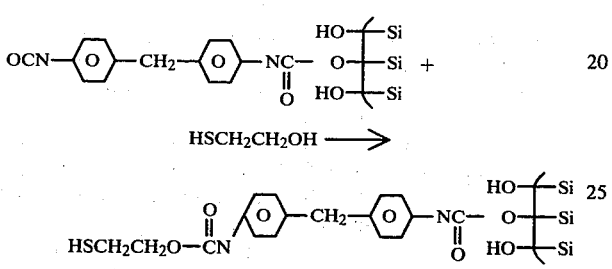

The use of the vapor phase has the advantage that there is no solvent to be recycled.

In one embodiment of the present invention, dry kaolin clay is contacted with from 0.2% to 3% by weight of a diisocyanate compound which has been vaporized for a period of time sufficient to surface treat the clay. This period of time is preferably about thirty minutes, but it can be as short as ten minutes or as long as 1 hour. When the reaction time is below ten minutes, the amount of surface treatment is negligible. Reaction times of more than one hour do not result in surface treatment superior to the one hour level. When less than 0.2% by weight diisocyanate compound is used there is negligible surface treatment. Using more than 3% by weight diisocyanate compound gives no more beneficial effect than the levels used in the present invention. The reaction temperature must be high enough to keep the diisocyanate compound vaporized. The vapor should be free of water, and the clay should be dry. If free water is present, undesirable reactions occur. The clay should be continuously stirred during the treatment so as to maximize the amount of surface treated. The surface treated kaolin clay is then blended into an organic elastomer. One method of contacting the clay with the diisocyanate vapor is in a fluidized bed.

In another embodiment of the present invention, kaolin clay is contacted with up to 3% by weight of a diisocyanate compound in a solvent, such as benzene, o-xylene or toluene, for a period of time sufficient to surface treat the clay. This period of time can range from as short as ten minutes to as long as one hour. The reaction occurs at reflux temperatures. The surface treated kaolin clay is then blended into an organic elastomer.

The clay can be further treated with a compound reactive with isocyanate to form different pendant groups prior to it being blended into the organic elastomer. For instance, when a clay which has been treated with TDI is further treated with mercaptoethanol the result is a clay surface modified with pendant mercapto groups bridged to the surface by TDI through hydroxyl-isocyanate coupling. This is a low cost method of producing a mercapto-functional kaolin clay, costing far less than the process of treating clay with mercaptosilanes. One reason why this process is less expensive than the mercaptosilane process is that the combined cost of the diisocyanates and mercaptoethanol is less than that of mercaptosilanes.

Examples of different compounds which can be used to form pendant mercapto groups are mercaptoethanol; triethylamine plus hydrogen sulfide gas; and mercapto acetic acid.

Examples of different compounds which can be used to form pendant amino groups are water; triethylamine plus 1,6-hexamethylenediamine; triethylamine plus hexamethylenimine; and ethylenediamine.

EXAMPLES

The invention will be further illustrated by the following examples which set forth particularly advantageous method and composition embodiments. While the examples are provided to illustrate the present invention, they are not intended to limit it. While Examples I through XXII are examples of the present invention, Control Examples A, B and C are not examples of the present invention.

In all of the examples, the following elastomer formulation was used.

| | | |
|---|---|---|
| Natsyn 2200 | 100 | parts |
| Zinc Oxide | 5 | parts |
| Stearic Acid | 2 | parts |
| Clay | 75 | parts |
| Sulfur | 2.75 | parts |
| Agerite White | 1 | part |
| Amax | 1.25 | parts |
| Methyl Tuads | 0.20 | part |
| Total | 187.20 | parts |

Natsyn 2200 is a registered trademark of The Goodyear Tire & Rubber Co. for a polyisoprene rubber. Agerite White is a registered trademark of the B. F. Goodrich Chemical Co. for an antioxidant (bisbetanapthyl-p-phenylenediamine). Amax is a registered trademark of the Goodyear Tire & Rubber Co. for an accelerator (benzothiazyl disulfide). Methyl Tuads is a registered trademark of the R. T. Vanderbilt Corporation for another accelerator (Tetramethythiurum-disulfide).

CONTROL EXAMPLE A

Suprex clay was treated with 0.6% gamma-mercaptopropyltrimethoxysilane. This surface treated modified clay was blended into the elastomer formulation shown above.

EXAMPLE I

Suprex clay was treated with 0.53% TDI by weight of the clay in the vapor phase free from water vapor at 140 degrees Celsius while stirring for 30 minutes, then 0.24% mercaptoethanol (MCE) by weight clay was added and the mixture was raised to a temperature of 180 degrees Celsius and the heat was turned off. The resulting kaolin product had its surface modified with pendant mercapto groups bridged to the surface by TDI through hydroxyl-isocyanate coupling. This surface treated modified clay was blended into the elastomer formulation shown above.

EXAMPLE II

Suprex clay was treated with 1.5% TDI in the vapor phase free from water vapor for 30 minutes at 140 degrees Celsius, then 0.68% MCE was added and the mixture was raised to a temperature of 180 degrees Celsius and was allowed to cool while stirring. The resulting kaolin product had its surface modified with pendant mercapto groups bridged to the surface by TDI through hydroxylisocyanate coupling. This surface treated modified clay was blended into the elastomer formulation shown above.

EXAMPLE III

Suprex clay was refluxed with 1% TDI in o-xylene for 15 minutes, cooled to 60 degrees Celsius, then 0.45% MCE was added and refluxed for 15 minutes. The resulting kaolin product had its surface modified with pendant mercapto groups bridged to the surface by TDI through hydroxyl-isocyanate coupling. This surface treated modified clay was blended into the elastomer formulation shown above.

EXAMPLE IV

Suprex clay was refluxed with 2% MDI in benzene for 60 minutes, cooled to room temperature, then 0.63% MCE was added and refluxed for 60 minutes. The resulting kaolin-product had its surface modified with pendant mercapto groups bridged to the surface by MDI through hydroxyl-isocyanate coupling. This surface treated modified clay was blended into the elastomer formulation shown above.

EXAMPLE V

Suprex clay was refluxed with 2% MDI in o-xylene for 15 minutes, cooled to 60 degrees Celsius, then 0.63% MCE was added and refluxed for 15 minutes. The resulting kaolin-product had its surface modified with pendant mercapto groups bridged to the surface by MDI through hydroxyl-isocyanate coupling. This surface treated modified clay was blended into the elastomer formulation shown above.

EXAMPLE VI

Suprex clay was refluxed with 1% MDI in o-xylene for 15 minutes, cooled to 60 degrees Celsius, then 0.32% MCE was added and refluxed for 15 minutes. The resulting kaolin-product had its surface modified with pendant mercapto groups bridged to the surface by MDI through hydroxyl-isocyanate coupling. This surface treated modified clay was blended into the elastomer formulation shown above.

EXAMPLE VII

Suprex clay was refluxed with 0.6% MDI in o-xylene for 15 minutes, cooled to 60 degrees Celsius, then 0.20% MCE was added and refluxed for 15 minutes. The resulting kaolin-product had its surface modified with pendant mercapto groups bridged to the surface by MDI through hydroxyl-isocyanate coupling. This surface treated modified clay was blended into the elastomer formulation shown above.

Examples I through VII produce organic elastomer compositions containing kaolin-products with their surfaces modified with pendant mercapto groups bridged to the surface by either TDI or MDI through hydroxyl-isocyanate coupling. These products are produced by first surface treating kaolin clay with either TDI or MDI in either the vapor phase or the liquid phase, then reacting the diisocyanate modified clay with mercaptoethanol, then blending the modified clay into an organic elastomer composition.

The following tests were performed on the elastomer composition cured for both 10 and 15 minutes at 293 degrees Fahrenheit: Modulus, tensile strength and elongation were measured by using the procedures of ASTM B-412. Shore A hardness was measured by using the procedures of ASTM D-2240. Firestone Flexometer was measured by using the procedure of ASTM D-623, method B. Mooney scorch and Mooney Viscosity were measured by using the procedures of ASTM B-1646-63.

TABLE I

| 293° F. Cure Min. | Mercapto-Functional Kaolin Clay Via TDI or MDI Coupling and Mercaptoethanol | | | | | | | |
|---|---|---|---|---|---|---|---|---|
| | Control A | I | II | III | IV | V | VI | VII |
| 100% Modulus, psi | | | | | | | | |
| 10 | 490 | 480 | 540 | 560 | 470 | 460 | 420 | 460 |
| 15 | 480 | 460 | 550 | 520 | 490 | 480 | 500 | 550 |
| 300% Modulus, psi | | | | | | | | |
| 10 | 1600 | 1460 | 1540 | 1550 | 1430 | 1470 | 1470 | 1500 |
| 15 | 1610 | 1400 | 1540 | 1480 | 1460 | 1490 | 1650 | 1680 |
| Tensile, psi | | | | | | | | |
| 10 | 3790 | 3560 | 2970 | 3270 | 3960 | 3690 | 3880 | 3700 |
| 15 | 3720 | 3500 | 2960 | 3260 | 3490 | 3460 | 3450 | 3460 |
| Elongation, psi | | | | | | | | |
| 10 | 560 | 550 | 500 | 500 | 560 | 550 | 570 | 560 |
| 15 | 550 | 550 | 500 | 520 | 520 | 530 | 510 | 510 |
| Hardness, Shore $A_2$ | | | | | | | | |
| 10 | 59 | 59 | 62 | 61 | 57 | 60 | 59 | 59 |
| 15 | 60 | 60 | 62 | 62 | 60 | 61 | 60 | 60 |
| Flexometer, Firestone, °F. | | | | | | | | |
| 30 | 148 | 135 | 125 | 136 | 130 | 128 | 126 | 131 |
| Compression Set B 22 hours @ 158° F. | | | | | | | | |
| 30 | 16.2 | 22.1 | 15.4 | 20 | 16.5 | 18.3 | 18.8 | 19.5 |
| Mooney Scorch MS 3' @ 250° F. | | | | | | | | |
| | 27 | 28 | 26 | 29 | 34 | 44 | 42 | 36 |
| Mooney Viscosity ML | | | | | | | | |

TABLE I-continued

| 293° F. Cure Min. | Mercapto-Functional Kaolin Clay Via TDI or MDI Coupling and Mercaptoethanol | | | | | | | |
|---|---|---|---|---|---|---|---|---|
| | Control A | I | II | III | IV | V | VI | VII |
| 4' @ 212° F. | 48 | 54 | 64 | 65 | 63 | 54 | 61 | 58 |

The above data shows that the present invention produces an inexpensive elastomer composition having low heat buildup. Note that the Flexometer readings of the examples of the present invention are from 8 to 16% less than that of the control example.

CONTROL EXAMPLE B

Suprex clay was treated with 0.6% gamma-mercaptopropyltrimethoxysilane. This surface treated modified clay was blended into the elastomer formulation shown above.

EXAMPLE VIII

Suprex clay was treated with 3% TDI in the vapor phase free from water vapor at 100 degrees Celsius for 10 minutes, cooled to 60 degrees Celsius, then 20 cc of triethylamine plus hydrogen sulfide was added and heated to 80 degrees Celsius for 30 minutes. The resulting kaolin product had its surface modified with pendant mercapto groups bridged to the surface by TDI through hydroxylisocyanate coupling. This surface treated modified clay was blended into the elastomer formulation shown above.

EXAMPLE IX

Suprex clay was refluxed with 3% TDI in benzene for 60 minutes, cooled to 50 degrees Celsius, then 20 cc of triethylamine and hydrogen sulfide were added for five minutes and dried at 80 degrees Celsius in a vacuum oven. The resulting kaolin-product had its surface modified with pendant mercapto groups bridged to the surface by TDI through hydroxyl-isocyanate coupling. This surface treated modified clay was blended into the elastomer formulation shown above.

EXAMPLE X

Suprex clay was refluxed with 2% MDI in benzene for 60 minutes, cooled to 60 degrees Celsius, then 0.5% ammonium sulfide was added and refluxed for 60 minutes. The resulting kaolin-product had its surface modified with pendant mercapto groups bridged to the surface by MDI through hydroxyl-isocyanate coupling. This surface treated modified clay was blended into the elastomer formulation shown above.

EXAMPLE XI

Suprex clay was refluxed with 2% MDI in toluene for 60 minutes, cooled to 50 degrees Celsius, then 20 cc of triethylamine and hydrogen sulfide gas were added and refluxed for 15 minutes. The resulting kaolin-product had its surface modified with pendant mercapto groups bridged to the surface by MDI through hydroxylisocyanate coupling. This surface treated modified clay was blended into the elastomer formulation shown above.

EXAMPLE XII

Suprex clay was refluxed with 0.8% MDI in toluene for 60 minutes, cooled to 50 degrees Celsius, then hydrogen sulfide was added at a rate of 0.2 scfm for 15 minutes and refluxed for 15 minutes. The resulting kaolin-product had its surface modified with pendant mercapto groups bridged to the surface by MDI through hydroxyl-isocyanate coupling. This surface treated modified clay was blended into the elastomer formulation shown above.

EXAMPLE XIII

Suprex clay was refluxed with 2% TDI in toluene for 30 minutes, cooled to 50 degrees, then 1% mercaptoacetic acid (MCA) was added and refluxed for 45 minutes. The resulting kaolin-product had its surface modified with pendant mercapto groups bridged to the surface by TDI through hydroxyl-isocyanate coupling. This surface treated modified clay was blended into the elastomer formulation shown above.

EXAMPLE XIV

Suprex clay was refluxed with 0.8% MDI for 60 minutes, then 0.30% MCA was added and refluxed for 60 minutes. The resulting kaolin-product had its surface modified with pendant mercapto groups bridged to the surface by MDI through hydroxyl-isocyanate coupling. This surface treated modified clay was blended into the elastomer formulation shown above.

Examples VIII through XIV produce organic elastomer compositions containing kaolin products with their surfaces modified with pendant mercapto groups bridged to the surface by either TDI or MDI through hydroxyl-isocyanate coupling. These products are produced by first surface treating kaolin clay with either TDI or MDI in either the vapor phase or the liquid phase, then reacting the diisocyanate modified clay with a mercapto compound reactive with isocyanate, then blending the modified clay into an organic elastomer composition.

TABLE II

| 293° F. Cure Min. | Mercapto-Functional Kaolin Clay Via TDI or MDI Coupling | | | | | | | |
|---|---|---|---|---|---|---|---|---|
| | Control B | VIII | IX | X | XI | XII | XIII | XIV |
| 100% Modulus, psi | | | | | | | | |
| 10 | 510 | 490 | 480 | 470 | 420 | 510 | 490 | 570 |
| 15 | 500 | 490 | 470 | 490 | 500 | 490 | 480 | 510 |
| 300% Modulus, psi | | | | | | | | |
| 10 | 1660 | 1280 | 1350 | 1270 | 1390 | 1390 | 1400 | 1400 |
| 15 | 1640 | 1240 | 1200 | 1400 | 1400 | 1380 | 1390 | 1380 |
| Tensile, psi | | | | | | | | |
| 10 | 3750 | 3240 | 3280 | 3600 | 4180 | 3450 | 3530 | 3380 |

TABLE II-continued

| 293° F. Cure Min. | Mercapto-Functional Kaolin Clay Via TDI or MDI Coupling | | | | | | | |
| --- | --- | --- | --- | --- | --- | --- | --- | --- |
| | Control B | VIII | IX | X | XI | XII | XIII | XIV |
| 15 | 3620 | 2920 | 3250 | 3570 | 3860 | 3380 | 3400 | 3200 |
| Elongation, psi | | | | | | | | |
| 10 | 550 | 520 | 580 | 450 | 600 | 540 | 550 | 520 |
| 15 | 540 | 500 | 550 | 520 | 530 | 550 | 520 | 510 |
| Hardness, Shore $A_2$ | | | | | | | | |
| 10 | 59 | 62 | 62 | 60 | 62 | 62 | 60 | 62 |
| 15 | 60 | 62 | 62 | 60 | 62 | 62 | 61 | 62 |
| Flexometer, Firestone, °F. | | | | | | | | |
| 30 | 146 | 123 | 135 | 121 | 134 | 137 | 136 | 130 |
| Compression Set B, 22 hours @ 158° F. | | | | | | | | |
| 30 | 15.9 | 19.8 | 19.7 | 14.0 | 17.8 | 20.4 | 17.6 | 18.1 |
| Mooney Scorch MS 3' @ 250° F. | 27 | 23 | 46 | 53 | 38 | 48 | 14 | 16 |
| Mooney Viscosity ML 4' @ 212° F. | 47 | 55 | 55 | 68 | 62 | 61 | 52 | 60 |

The above data shows that the present invention produces an inexpensive elastomer having low heat buildup. Note that the Flexometer readings of the examples of the present invention are from 6 to 17% less than that of the control example.

CONTROL EXAMPLE C

Suprex clay was treated with 0.6% gamma-mercaptopropyltrimethoxysilane. This surface treated modified clay was blended into the elastomer formulation shown above.

EXAMPLE XV

Suprex clay was refluxed with 3% TDI in benzene for 60 minutes, cooled and 20 cc of triethylamine plus 2% 1,6-hexanediamine was added then refluxed for 60 minutes. The resulting kaolin-product had its surface modified with pendant amino groups bridged to the surface by TDI through hydroxyl-isocyanate coupling. This surface treated modified clay was blended into the elastomer formulation shown above.

EXAMPLE XVI

Suprex clay was refluxed with 3% TDI in toluene for 60 minutes, cooled to 60 degrees Celsius, then 20 cc of triethylamine plus 1.7% hexamethylenimine was added and refluxed for 60 minutes. The resulting kaolin-product had its surface modified with pendant amino groups bridged to the surface by TDI through hydroxylisocyanate coupling. This surface treated modified clay was blended into the elastomer formulation shown above.

EXAMPLE XVII

Suprex clay was treated with 0.53% TDI in the vapor phase at 140 degrees Celsius while stirring for 30 minutes, then 0.2% ethylenediamine was added, the temperature was raised to 180 degrees Celsius, then the heat was turned off. The resulting kaolin-product had its surface modified with pendant amino groups bridged to the surface by TDI through hydroxyl-isocyanate coupling. This surface treated modified clay was blended into the elastomer formulation shown above.

EXAMPLE XVIII

Suprex clay was treated with 1% TDI in O-dichlorobenzene at 140 degrees Celsius for 10 minutes, cooled to 60 degrees Celsius, then 2.6 grams of water was added and heated at 140 degrees Celsius for 10 minutes. The resulting kaolin-product had its surface modified with pendant amino groups bridged to the surface by TDI through hydroxyl-isocyanate coupling. This surface treated modified clay was blended into the elastomer formulation shown above.

EXAMPLE XIX

Suprex clay was refluxed with 2% MDI in toluene for 60 minutes, cooled to 50 degrees Celsius, then 20 cc triethylamine plus 0.8% hexamethylenimine and refluxed for 60 minutes. The resulting kaolin-product had its surface modified with pendant amino groups bridged to the surface by MDI through hydroxyl-isocyanate coupling. This surface treated modified clay was blended into the elastomer formulation shown above.

EXAMPLE XX

Suprex clay was refluxed with 0.8% MDI in o-xylene, cooled to 60 degrees Celsius, then 10 cc triethylamine and 0.2% ethylenediamine were added and the resulting mixture refluxed 15 minutes. The resulting kaolin-product had its surface modified with pendant amino groups bridged to the surface by MDI through hydroxylisocyanate coupling. This surface treated modified clay was blended into the elastomer formulation shown above.

EXAMPLE XXI

Suprex clay was refluxed with 0.8% MDI in o-xylene, cooled to 60 degrees Celsius, then hexamediamine is added and refluxed for 15 minutes. The resulting kaolin-product had its surface modified with pendant amino groups bridged to the surface by MDI through hydroxyl-isocyanate coupling. This surface treated modified clay was blended into the elastomer formulation shown above.

EXAMPLE XXII

Suprex clay was refluxed with 1% MDI in toluene for 15 minutes, then 2 grams water and 10 cc triethylamine were added and refluxed for 15 minutes. The resulting kaolin-product had its surface modified with pendant amino groups bridged to the surface by MDI through hydroxyl-isocyanate couplings. This surface treated modified clay was blended into the elastomer formulation shown above.

Examples XV through XXII produce organic elastomer compositions containing kaolin-products with their surfaces modified with pendant amino groups bridged to the surface by either TDI or MDI through hydroxyl-isocyanate coupling. These products are produced by first surface treating kaolin clay with either TDI or MDI in either the vapor phase or the liquid phase, then reacting the diisocyanate modified clay with an amino compound reactive with isocynate or with water, then blending the modified clay into an organic elastomer composition.

TABLE III

| 293° F. Cure Min. | Control C | XV | XVI | XVII | XVIII | XIX | XX | XXI | XXII |
|---|---|---|---|---|---|---|---|---|---|
| AMINO-FUNCTIONAL CLAY VIA TDI or MDI | | | | | | | | | |
| 100 Modulus, psi | | | | | | | | | |
| 10 | 520 | 530 | 500 | 510 | 480 | 540 | 490 | 510 | 510 |
| 15 | 510 | 520 | 500 | 490 | 450 | 550 | 490 | 490 | 480 |
| 200 Modulus, psi | | | | | | | | | |
| 10 | 1670 | 1290 | 1350 | 1350 | 1360 | 1560 | 1310 | 1390 | 1560 |
| 15 | 1660 | 1140 | 1290 | 1320 | 1260 | 1480 | 1300 | 1350 | 1480 |
| Tensile, psi | | | | | | | | | |
| 10 | 3850 | 3230 | 2500 | 3280 | 3500 | 3900 | 3170 | 3520 | 3200 |
| 15 | 3750 | 2820 | 2890 | 3460 | 3280 | 3400 | 3260 | 3280 | 3400 |
| Elongation, psi | | | | | | | | | |
| 10 | 550 | 510 | 430 | 520 | 560 | 550 | 510 | 520 | 490 |
| 15 | 550 | 510 | 490 | 550 | 540 | 510 | 520 | 510 | 530 |
| Hardness, Shore $A_2$ | | | | | | | | | |
| 10 | 60 | 60 | 62 | 61 | 61 | 60 | 62 | 60 | 61 |
| 15 | 60 | 60 | 62 | 62 | 61 | 60 | 62 | 61 | 62 |
| Flexometer, Firestone, °F. | | | | | | | | | |
| 30 | 147 | 126 | 130 | 130 | 137 | 130 | 128 | 134 | 134 |
| Compression Set B, 22 hours @ 158° F. | | | | | | | | | |
| 30 | 16.2 | 16.4 | 14.9 | 20.0 | 16.7 | 19.2 | 18.6 | 17.6 | 19.6 |
| Mooney Scorch MS 3' @ 250° F. | 28 | 33 | 34 | 23 | 36 | 37 | 20 | 30 | 37 |
| Mooney Viscosity ML 4' @ 212° F. | 47 | 58 | 59 | 56 | 65 | 59 | 60 | 60 | 63 |

The above data shows that the present invention produces an inexpensive elastomer having low heat buildup. Note that the Flexometer readings of the examples of the present invention are from 7 to 14% less than that of the control example.

Thus, in operation, a variety of functional groups can be appended to a clay used in elastomer compositions as a filler by first surface treating the clay with a diisocyanate compound, then reacting the treated clay with a compound having both the desired functional group and a group reactive with isocyanate.

While the present invention has been described with reference to specific embodiments, this application is intended to cover those various changes and substitutions which may be made by those skilled in the art without departing from the spirit and scope of the appended claims.

I claim:

1. A method of producing an organic elastomer containing a surface treated modified kaolin clay comprising:
    (a) vaporizing a diisocyanate compound selected from the group consisting of 2,4-tolylene diisocyanate and 4,4'-diphenylanethane diisocyanate;
    (b) contacting said vaporized diisocyanate compound with a dry kaolin clay for a period of time from ten minutes to one hour in the absence of water vapor so that the diisocyanate constitutes a level of from 0.2 to 3% by weight of the kaolin clay;
    (c) treating the modified clay with mercaptoethanol; and
    (d) blending the resulting surface treated modified clay into an organic elastomer.

* * * * *